United States Patent
Ruan et al.

(10) Patent No.: US 12,555,153 B2
(45) Date of Patent: Feb. 17, 2026

(54) RECOMMENDATION METHOD, PRODUCT, AND SYSTEM USING USER EMBEDDINGS HAVING STABLE LONG-TERM COMPONENT AND DYNAMIC SHORT-TERM SESSION COMPONENT

(71) Applicant: Maplebear Inc., San Francisco, CA (US)

(72) Inventors: Chuanwei Ruan, Sunnyvale, CA (US); Yunzhi Ye, Bothell, WA (US); Han Li, Sunnyvale, CA (US); David Vengerov, San Jose, CA (US); Allan Stewart, Berkeley, CA (US); Aref Kashani Nejad, Redmond, WA (US)

(73) Assignee: Maplebear Inc., San Francisco, CA (US)

( * ) Notice: Subject to any disclaimer, the term of this patent is extended or adjusted under 35 U.S.C. 154(b) by 242 days.

(21) Appl. No.: 18/217,324

(22) Filed: Jun. 30, 2023

(65) Prior Publication Data
US 2025/0005644 A1    Jan. 2, 2025

(51) Int. Cl.
*G06Q 30/00* (2023.01)
*G06Q 30/0601* (2023.01)

(52) U.S. Cl.
CPC ................. *G06Q 30/0631* (2013.01)

(58) Field of Classification Search
CPC ........................ G06Q 30/0601–0645
See application file for complete search history.

(56) References Cited

U.S. PATENT DOCUMENTS

| | | |
|---|---|---|
| 2005/0209982 A1 | 9/2005 | Jin et al. |
| 2020/0104687 A1 | 4/2020 | Gesmundo |

(Continued)

FOREIGN PATENT DOCUMENTS

WO    WO-2023057901 A1 *    4/2023

OTHER PUBLICATIONS

C. Yan, Y. Wang, Y. Zhang, Z. Wang and P. Wang, "Modeling Long- and Short-Term User Behaviors for Sequential Recommendation with Deep Neural Networks," 2021 International Joint Conference on Neural Networks (IJCNN), Shenzhen, China , 2021, pp. 1-8. (Year: 2021).*

(Continued)

*Primary Examiner* — Jeffrey A. Smith
*Assistant Examiner* — Kennedy Gibson-Wynn
(74) *Attorney, Agent, or Firm* — Fenwick & West LLP

(57) ABSTRACT

An online system accesses a two-tower model trained to identify candidate items for presentation to users, in which the model includes an item tower trained to compute item embeddings and a user tower trained to compute user embeddings. The user tower includes a long-term sub-tower trained to compute long-term embeddings for users and a short-term sub-tower trained to compute short-term embeddings for users. The model is trained based on item data associated with items, user data associated with users, and session data associated with user sessions. The system uses the item tower to compute an item embedding for each of multiple candidate items. The system also uses the long-term sub-tower to compute a long-term embedding for a user. The system then receives session data associated with a current session of the user and uses the short-term sub-tower to compute a short-term embedding for the user based on this session data.

19 Claims, 6 Drawing Sheets

(56) References Cited

U.S. PATENT DOCUMENTS

| | | | |
|---|---|---|---|
| 2020/0334599 A1 | 10/2020 | Zayats et al. | |
| 2021/0357744 A1 | 11/2021 | Mittal et al. | |
| 2021/0390609 A1* | 12/2021 | Trinh | G06N 3/082 |
| 2021/0397892 A1 | 12/2021 | Huang et al. | |
| 2023/0401464 A1* | 12/2023 | Fan | G06F 16/735 |
| 2025/0053992 A1* | 2/2025 | Kumar | G06Q 30/015 |

OTHER PUBLICATIONS

L. Niu, Y. Peng and Y. Liu, "Deep Recommendation Model Combining Long - and Short-Term Interest Preferences" in IEEE Access, vol. 9, pp. 166455-166464, 2021, doi: 10.1109/ACCESS.2021.3135983. (Year: 2021).*

R. Nareshkumar, K. Agalya, A. Arunpandiyan, et al. "An Effective Deep Learning based Recommender System with user and item embedding," 2023 International Conference on Artificial Intelligence and Knowledge Discovery in Concurrent Engineering (ICECONF), Chennai, India (Year: 2023).*

Schifferer, Benedikt. "Solving the Cold-Start Problem Using Two-Tower Neural Networks for Nvidia's e-Mail Recommender . . . " Medium, Nvidia Merlin, Jan. 11, 2023. (Year: 2023).*

Villatel, Kiewan, et al. "Recurrent neural networks for long and short-term sequential recommendation." arXiv preprint arXiv:1807.09142 (2018). (Year: 2018).*

PCT International Search Report and Written Opinion, PCT Application No. PCT/US24/28927, Aug. 1, 2024, 14 pages.

\* cited by examiner

RECOMMENDATION METHOD, PRODUCT, AND SYSTEM USING USER EMBEDDINGS HAVING STABLE LONG-TERM COMPONENT AND DYNAMIC SHORT-TERM SESSION COMPONENT

BACKGROUND

Online systems, such as online concierge systems, may recommend items (e.g., goods or products) to their users. Online systems may do so by identifying candidate items for recommendation to the users that the users are most likely to find relevant based on information that is specific to each user. For example, an online system may identify candidate items for recommendation to a user based on historical data describing previous orders placed by the user with the online system, the user's preferences, session data associated with a current session of the user (e.g., information describing items with which the customer interacted), etc. In this example, the candidate items may include items the user is likely to purchase again, items for which the user has a preference, items with which the user interacted, etc. Once candidate items are identified for recommendation to a user, one or more of the candidate items may be selected (e.g., based on their predicted availabilities, based on a predicted affinity of the user for each candidate item, etc.) and presented to the user.

However, the process by which online systems identify candidate items for recommendation to their users may be inefficient since online system users may experience high latency, especially when several items may be available for recommendation to them. For example, if thousands of items included among an inventory of a retailer may be recommended to a user of an online system, due to limited computational resources available to evaluate each item, the user may experience a delay when waiting for the recommended items to be presented to them as the online system evaluates each item to determine whether it should be recommended to the user. As such, the failure to efficiently identify relevant candidate items for presentation to users of online systems may have a negative impact on user retention.

SUMMARY

In accordance with one or more aspects of the disclosure, an online system recommends items for a user by comparing a user embedding for the user to one or more item embeddings for one or more candidate items. In one or more embodiments, the online system computes the user and item embeddings using a two-tower model, which includes an item tower trained to compute item embeddings and a user tower trained to compute user embeddings. The two-tower model combines the user and item embeddings (e.g., by computing a dot product of the two embedding vectors) to score a candidate item for presentation to a user. In one or more embodiments, the item tower and the user tower each comprises layers of a deep neural network.

In one or more embodiments, the user embedding for a user comprises a combination of two components: a long-term user embedding and a short-term user embedding. To compute the long-term embedding and the short-term embedding for a user, the user tower includes a long-term sub-tower and a short-term sub-tower, respectively. The long-term sub-tower is trained to compute long-term embeddings for a user based on input features that are contextually constant and thus do not vary from session to session, such as the user's demographic information and preferences. This enables the long-term embedding for a user to be pre-computed, e.g., before a user visits the online system, and possibly stored in connection with the user's profile. The short-term sub-tower, in contrast, is trained to compute the short-term embedding for a user based on dynamic input features, such as details about the user's current session with the online system. Because such input features are not known until the session begins, the short-term embedding cannot be pre-computed. As such, in one or more embodiments, the short-term sub-tower may be lighter weight (i.e., smaller, with fewer features or fewer layers) than the long-term sub-tower. Accordingly, although long-term embeddings may be pre-computed and short-term embeddings may not, the short-term embeddings may be computed with low latency.

In one or more embodiments, the two-tower model is trained by receiving item data associated with items, user data associated with users, and session data associated with sessions of the users and training the model based on the item data, user data, and session data. For each training example, the online system uses the item tower to compute an item embedding for an item, uses the long-term sub-tower to compute a long-term embedding for a user, and uses the short-term sub-tower to compute a short-term embedding for the user based on the set of session data. The system combines the long-term embedding and the short-term embedding to generate a user embedding, and the system compares the user embedding to the item embedding, e.g., by computing a dot product of the two vectors. The result represents the model's prediction of an interaction between the user and the item (e.g., that the user will purchase the item). The system compares this prediction to an observed interaction from the training example (e.g., whether the user actually did interact with the item). Finally, the system determines an error term from that comparison and then adjusts the parameters of each of the towers of the model to train the two-tower model. In one or more embodiments, the model may be periodically re-trained by using the model to recommend items to users and then repeating the training process with the observed results of the recommendations, thereby enabling the computer system to improve in its task of recommending items for users using the disclosed models.

During an inference stage, once the two-tower model is trained, the online system may identify a set of candidate items for presentation to a user. In one or more embodiments, the online system retrieves a pre-computed long-term embedding for the user from memory, computes a short-term user embedding for the user using the short-term sub-tower of the user tower of the model, and combines the long-term and short-term embeddings to form the user embedding. The online system also computed an embedding for each of the set of candidate items using the item tower. The online system then computes a score for each candidate item by comparing the candidate item's embedding with the user embedding. Finally, the online system may make a recommendation to the user of one or more of the candidate items based on these scores.

DETAILED DESCRIPTION

Figure 1:
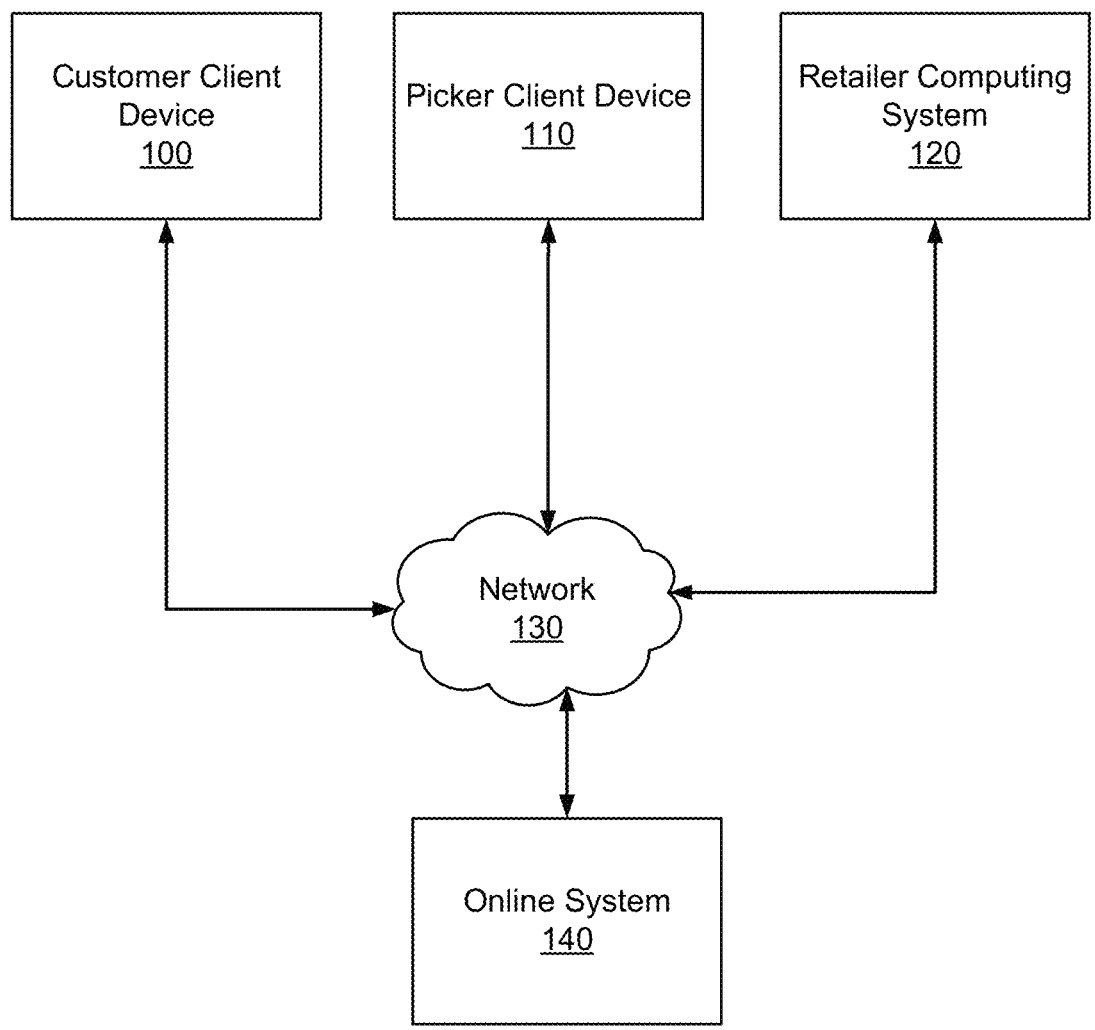
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, refers to a good or product that may be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the customer has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the customer to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the customer's order to the picker in a collection interface. The collection interface is a user interface that provides information to the picker identifying items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a customer's order (e.g., as a commission).

The customer client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer. As an example, the online system 140 may allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

Figure 2:
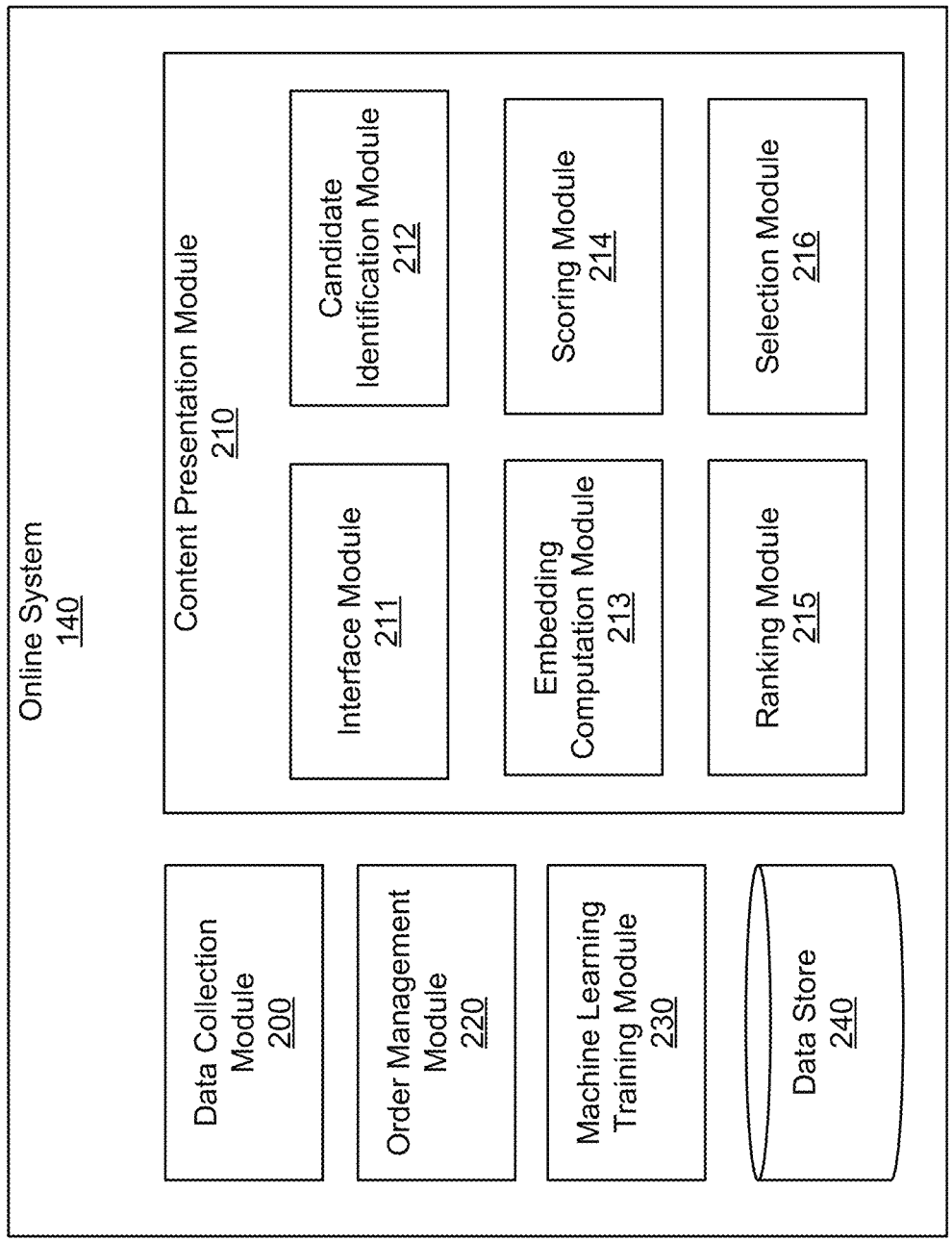
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects customer data, which is information or data that describe characteristics or other types of information associated with a customer. Customer data may include a customer's name, address, shopping preferences, favorite items, favorite retailers, stored payment instruments, dietary preferences (e.g., vegetarian, gluten-free, etc.), or demographic information (e.g., age, gender, etc.). The customer data also may include default settings established by a customer, such as a default retailer/retailer location, payment instrument, delivery location, or delivery timeframe. Customer data also may include historical information, such as historical interaction information or historical order/purchase information associated with a customer. For example, customer data may include information describing previous orders placed by a customer with the online system 140 or information describing previous purchases made by the customer at retailer locations. As an additional example, customer data may include information describing previous interactions by a customer with items presented by the online system 140, such as information describing the items (e.g., item types and prices), the types of interactions (e.g., adding items to a shopping list, searching for or clicking on items, etc.), and the times of the interactions (e.g., a timestamp associated with each interaction). Furthermore, customer data may include information that may be derived from other customer data, such as a frequency with which a customer orders an item, an average number of items included in each order placed by the customer, etc. The data collection module 200 may collect the customer data from sensors on the customer client device 100 or based on a customer's interactions with the online system 140.

The data collection module 200 also collects item data, which is information or data that identifies and describes items that are available at a retailer location. Item data may include various types of data, such as image data, video data, audio data, text data, etc. For example, item data may include images or videos of items. The item data may include item identifiers for items that are available and may include quantities of items associated with each item identifier. Additionally, item data may also include attributes of items such as the sizes, colors, weights, stock keeping units (SKUs), serial numbers, prices, item categories, brands, sales, discounts, qualities (e.g., freshness, ripeness, etc.), ingredients, materials, manufacturing locations, or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a customer client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. For example, items such as soy sauce, ramen, and miso soup may be included in an "Asian foods" item category. Furthermore, in various embodiments, an item may be included in multiple categories. For example, cookies may be included in a "cookies" item category, a "snack foods" item category, as well as a "bakery department" item category. The item categories may be human-generated and human-populated with items. The item categories also may be generated automatically by the online system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data describing characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The data collection module 200 also collects session data, which is information or data describing characteristics of a session of a customer. Session data for a session of a customer may identify the session (e.g., via a session ID) and the customer (e.g., via a username) and describe a customer client device 100 (e.g., a mobile device or a laptop computer) or software (e.g., a browser or a client application) used to communicate with the online system 140, a location associated with the customer (e.g., GPS coordinates of the customer client device 100), and a time frame associated with the session. Session data also may describe a customer's interactions with the online system 140, such as information describing items with which the customer interacted, item data for the items, information describing types of the interactions (e.g., browsing, selecting, or searching for items, adding items to a shopping list, etc.), times of the interactions, dwell time, etc. The data collection module 200 may collect session data from sensors on the customer client device 100 or based on a customer's interactions with the online system 140. The data collection module 200 may collect real-time session data and communicate it to the content presentation module 210, as further described below. The data collection module 200 also may store session data in the data store 240.

The content presentation module 210 selects content for presentation to a customer. For example, the content presentation module 210 selects which items to present to a customer while the customer is placing an order. Components of the content presentation module 210 include: an interface module 211, a candidate identification module 212, an embedding computation module 213, a scoring module 214, a ranking module 215, and a selection module 216, which are further described below.

The interface module 211 generates and transmits an ordering interface for a customer to order items. The interface module 211 populates the ordering interface with items that the customer may select for adding to their order. In some embodiments, the interface module 211 presents a catalog of all items that are available to the customer, which the customer can browse to select items to order. Other components of the content presentation module 210 may identify items that the customer is most likely to order and the interface module 211 may then present those items to the customer. For example, the scoring module 214 may score items and the ranking module 215 may rank the items based on their scores. In this example, the selection module 216 may select items with scores that exceed some threshold (e.g., the top n items or the p percentile of items) and the interface module 211 then displays the items. In some embodiments, the interface module 211 generates and transmits an interface including objects other than items recommended to a customer, as further described below.

The candidate identification module 212 may access a two-tower model, which is a two-tower structured deep learning model that is trained to identify candidate items for presentation to users (e.g., customers) of the online system 140. The two-tower model may include an item tower and a user tower, in which the item tower is trained to compute item embeddings and the user tower is trained to compute user embeddings, such that each item and each user is represented as an N-dimensional embedding vector. Furthermore, the user tower may include a long-term sub-tower and a short-term sub-tower, in which the long-term sub-tower is trained to compute long-term embeddings describing long-term information associated with users and the short-term sub-tower is trained to compute short-term embeddings describing short-term information associated with users. The long-term embeddings may be computed based on user data associated with users (e.g., historical order or interaction information, user preferences, etc.) and may be pre-computed, while the short-term embeddings may be computed based on real-time session data associated with users and therefore may not be pre-computed. Although the short-term embeddings may not be pre-computed, the short-term sub-tower is lighter weight than the long-term sub-tower, allowing the short-term embeddings to be computed with low latency. In various embodiments, rather than an item tower, the two-tower model includes a tower that is trained to compute embeddings for objects other than items, such as content items (e.g., advertisements, social media posts, etc.), videos, images, games, recipes, or any other types of objects that may be recommended to users of the online system 140. In some embodiments, the two-tower model may be trained by the machine learning training module 230, as further described below.

The candidate identification module 212 also identifies candidate items for presentation to users of the online system 140. The candidate identification module 212 may identify candidate items for presentation to a user based on a maximum number of candidate items that may be evaluated due to limited computational resources available to perform the evaluation (e.g., to score, rank, and select candidate items for presentation to the user). For example, out of a total of 10,000 candidate items included among an inventory of a retailer, the candidate identification module 212 may identify 200 candidate items for presentation to a user since only 200 candidate items may be evaluated without high latency. The candidate identification module 212 may identify one or more sets of candidate items from various sources. In doing so, the candidate identification module 212 may identify each set of candidate items from a source (e.g., a popularity-based source, an embedding-based source, etc.) using an algorithm. For example, the candidate identification module 212 may identify a set of candidate items from a popularity-based source, in which the candidate identification module 212 uses an algorithm to identify the set of candidate items based on a popularity of each candidate item among users (e.g., globally or in a geographic region). In this example, the candidate identification module 212 also may identify another set of candidate items from an embedding-based source, in which the candidate identification module 212 uses a different algorithm to identify the candidate items based on a measure of similarity between a user embedding (e.g., a short-term or a long-term embedding) and an item embedding for each candidate item. Continuing with this example, the candidate identification module 212 may determine the measure of similarity using a k-nearest neighbors (KNN) algorithm, a cosine similarity, a Euclidean similarity, a dot product, etc., such that an item embedding for each identified candidate item has at least a threshold measure of similarity to the user embedding. In embodiments in which the candidate identification module 212 identifies candidate items from multiple sources, one or more candidate items may be included in more than one source. In embodiments in which the two-tower model includes a tower that is trained to compute embeddings for objects other than items, the candidate identification module 212 identifies candidate objects in an analogous manner.

The candidate identification module 212 also may determine a number or a percentage of candidate items identified from a particular source for presentation to a user of the online system 140. In some embodiments, the candidate identification module 212 makes the determination in real time based on information that is specific to the user (e.g., a set of preferences associated with the user, a set of contextual features associated with the user, etc.) using an algorithm (e.g., a contextual bandit algorithm). The algorithm solves an optimization problem for a policy that specifies the number/percentage of candidate items identified from different sources. For example, assuming the optimization problem is in a stochastic bandit setting, in which the reward corresponds to conversions for identified candidate items by a user, the candidate identification module 212 may solve for a policy that maximizes the long-term expected rewards based on an optimal number or percentage of candidate items identified from each source. In this example, the candidate identification module 212 may solve for the policy based on a total number of candidate items that may be identified, a number of sources from which candidate items may be identified, a set of contextual features, a set of features of each source (e.g., an algorithm associated with each source used to identify candidate items), or any other suitable types of information. In the above example, the set of contextual features may include metadata (e.g., demographic information) associated with the user, one or more surfaces (e.g., search results or browsing) for presenting the candidate items, a time of day, etc. In embodiments in which the candidate identification module 212 identifies candidate objects, the candidate identification module 212 also determines a number or a percentage of candidate objects identified from a particular source in an analogous manner.

Due to bias that may be introduced when training the two-tower model that may favor the identification of candidate items from a particular source, as described below, the candidate identification module 212 may adjust a bias associated with identifying candidate items for presentation to a user of the online system 140 from various sources. When solving the optimization problem for the policy that specifies the number/percentage of candidate items identified from different sources described above, the candidate identification module 212 may adjust this bias by modifying the reward using a weighting function. The weighting function may be based on a number or percentage of candidate items identified from a particular source. For example, the weighting function for a source may be inversely proportional to the number/percentage of candidate items identified from the source. The candidate identification module 212 also may adjust the bias associated with identifying candidate items from various sources based on a set of rules describing a penalty that is applied in response to identifying each candidate item from a particular source. For example, if the candidate identification module 212 identifies a candidate item from a particular source, the candidate identification module 212 may apply a penalty to the source based on a set of rules, such that additional candidate items are less likely to be identified from this source. The candidate identification module 212 also may adjust the bias associated with identifying candidate items from various sources based on a hard limit associated with each source. For example, each source of candidate items may be associated with a hard limit corresponding to a threshold number of candidate items that may be identified from the source, such that once the threshold number of candidate items have been identified from the source, additional candidate items must be identified from other sources. The candidate identification module 212 also may adjust the bias associated with identifying candidate items from various sources using a greedy algorithm (e.g., the E-greedy algorithm) or using any other suitable technique or combination of techniques. In some embodiments, the candidate identification module 212 adjusts a bias associated with identifying candidate objects for presentation to a user of the online system 140 from various sources in an analogous manner.

The embedding computation module 213 computes item embeddings for candidate items. The embedding computation module 213 may use the item tower of the two-tower model accessed by the candidate identification module 212 to compute an item embedding for each of multiple candidate items eligible for presentation to a user of the online system 140. A candidate item may be any item that is eligible for presentation to a user. For example, if a user is browsing items in a storefront for a retailer, candidate items may include all items included among an inventory of the retailer. The embedding computation module 213 may compute item embeddings for candidate items based on item data associated with the candidate items. For example, the embedding computation module 213 may use the item tower to compute an item embedding for a candidate item based on images or videos of the candidate item. In the above example, the embedding computation module 213 also or alternatively may use the item tower to compute the item embedding based on text data associated with the candidate item (e.g., a name, a description, an item category, a brand, a manufacturer, etc. of the candidate item). In embodiments in which the two-tower model includes a tower that is trained to compute embeddings for objects other than items, the embedding computation module 213 computes embeddings for candidate objects in an analogous manner.

The embedding computation module 213 also computes long-term embeddings for users of the online system 140. The embedding computation module 213 may use the long-term sub-tower of the user tower of the two-tower model accessed by the candidate identification module 212 to compute a long-term embedding for a user of the online system 140. As described above, a long-term embedding may be computed based on user data (e.g., customer data) associated with a user. For example, the embedding computation module 213 may use the long-term sub-tower to compute a long-term embedding for a customer based on historical order or interaction information for the customer (e.g., SKUs of each item the customer ordered or with which the customer interacted, a timestamp associated with each order or interaction, etc.) and a number of items included in each order placed by the customer. In this example, the long-term embedding for the customer also may be computed based on a number of items for which the customer searched, demographic information associated with the customer (e.g., age, gender, etc.), a set of preferences associated with the customer (e.g., dietary preferences), etc. As also described above, the embedding computation module 213 may pre-compute a long-term embedding for a user. For example, the embedding computation module 213 may compute a long-term embedding for a customer before the interface module 211 generates and transmits an ordering interface for the customer to order items (e.g., when the customer is offline).

The embedding computation module 213 also computes short-term embeddings for users of the online system 140.

The embedding computation module 213 may receive a set of session data associated with a current session of a user of the online system 140 and compute a short-term embedding for the user using the short-term sub-tower of the user tower of the two-tower model accessed by the candidate identification module 212 based on the set of session data. As described above, a short-term embedding may be computed based on real-time session data associated with a user and therefore may not be pre-computed. For example, the embedding computation module 213 may receive real-time session data for a customer from the data collection module 200, in which the real-time session data describes items presented to the customer, items the customer added to a shopping list, items for which the customer searched, items the customer browsed, items the customer selected, etc. In this example, the embedding computation module 213 may then use the short-term sub-tower to compute a short-term embedding for the customer based on the real-time session data.

The scoring module 214 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and user embeddings (e.g., long-term or short-term embeddings) describing customers to score items. These item embeddings and user embeddings may be generated by separate machine learning models and may be stored in the data store 240. As described above, these item embeddings and user embeddings also may be generated by the two-tower model.

In some embodiments, the scoring module 214 scores items based on a search query received from the customer client device 100. A search query is text for a word or set of words that indicate items of interest to the customer. The scoring module 214 scores items based on a relatedness of the items to the search query. For example, the scoring module 214 may apply natural language processing (NLP) techniques to the text in the search query to generate a search query representation (e.g., an embedding) that represents characteristics of the search query. The scoring module 214 may use the search query representation to score candidate items for presentation to a customer (e.g., by comparing a search query embedding to an item embedding).

In some embodiments, the scoring module 214 scores items based on a predicted availability of an item. The scoring module 214 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The scoring module 214 may weight the score for an item based on the predicted availability of the item. Alternatively, items may be filtered out from presentation to a customer based on whether the predicted availability of the item exceeds a threshold. In embodiments in which the candidate identification module 212 identifies candidate objects, the scoring module 214 scores the candidate objects in a manner analogous to that described above.

The ranking module 215 may rank one or more sets of candidate items identified by the candidate identification module 212. The ranking module 215 may rank candidate items based on a score computed for each candidate item by the scoring module 214. For example, based on a score computed for each of multiple candidate items by the scoring module 214, the ranking module 215 may rank the candidate items from highest to lowest based on the scores, such that a candidate item having a highest score is ranked first, a candidate item having a second-highest score is ranked second, etc. In embodiments in which the candidate identification module 212 identifies candidate objects, the ranking module 215 ranks one or more sets of candidate objects in a manner analogous to that described above.

The selection module 216 selects candidate items for presentation to users of the online system 140. The selection module 216 may select one or more candidate items for presentation to a user based on a score or a ranking associated with each candidate item. For example, the selection module 216 may select candidate items with scores that are at least a threshold score for presentation to a customer. As an additional example, the selection module 216 may select candidate items with at least a threshold ranking for presentation to a customer. In some embodiments, the selection module 216 selects candidate objects for presentation to users of the online system 140 in a manner analogous to that described above.

The order management module 220 manages orders for items from customers. The order management module 220 receives orders from customer client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models, support vector machines, naïve bayes, decision trees, k-nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model is used by the machine learning model to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In situations in which the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

In embodiments in which the candidate identification module 212 accesses a two-tower model that is trained to identify candidate items for presentation to users of the online system 140, the machine learning training module 230 may train the two-tower model based on various types of data (e.g., item data, user data, and session data) received by the data collection module 200. The machine learning training module 230 may train the item tower based on item data. For example, the item tower may be trained based on images of items, attributes (e.g., names, item categories, etc.) of items, purchasing rules for items, etc. In embodiments in which the two-tower model includes a tower that is trained to compute embeddings for objects other than items, the machine learning training module 230 trains the tower based on data (e.g., target audiences, topics, subjects, hashtags, etc.) for the objects. The machine learning training module 230 may train the long-term sub-tower of the user tower based on user data (e.g., customer data). For example, the long-term sub-tower of the user tower may be trained based on order/interaction histories, scalar features (number of items included in each previous order), metadata (e.g., demographic information), etc. associated with customers. The machine learning training module 230 may train the short-term sub-tower of the user tower based on session data. For example, the short-term sub-tower of the user tower may be trained based on information describing items customers clicked on, items presented to customers, and conversions for items by customers.

The machine learning training module 230 may train the item tower and user tower together. To do so, the machine learning training module 230 may first compute a user embedding by combining the short-term and long-term embedding for each user. For example, a user embedding may be computed as a weighted sum of a long-term embedding for a user and a short-term embedding for the user. Then, the machine learning training module 230 may determine a measure of similarity between the user embedding and an item embedding (e.g., as a dot product, a cosine similarity, etc.) corresponding to a user-item engagement prediction. The user-item engagement prediction indicates a likelihood that an event between a user and an item (e.g., a conversion event) occurred, such that the event is predicted to have occurred if the item is represented by an item embedding having at least a threshold measure of similarity to the user embedding.

The process used by the machine learning training module 230 to train the two-tower model may be a classification task, in which a label indicates whether an event between a user and an item occurred (e.g., whether a customer purchased the item), such that a positive label indicates the event occurred and a negative label indicates the event did not occur. The negative labels may be obtained using a negative sampling strategy (e.g., uniform random sampling, popular random sampling, impressions-based sampling, etc.). For example, negative sampling strategies may obtain negative labels using a strategy that samples items uniformly, randomly, based on their popularity, based on whether they were presented to a customer, based on whether a customer ever interacted with them, etc. When training the two-tower model, the machine learning training module 230 minimizes a loss function that measures the difference between the predicted and actual events. Based on the loss function, backpropagation is used to update the parameters of the model using an optimization algorithm (e.g., stochastic gradient descent) and the process is repeated to fine-tune the parameters until an optimal set of parameters is obtained. Since the data used to train the two-tower model may be biased (e.g., if the optimal set of parameters biases the identification of candidate items in favor of a particular source), the candidate identification module 212 may counter this by adjusting a bias associated with identifying candidate items from various sources using one or more of the techniques described above.

The data store 240 stores data used by the online system 140. For example, the data store 240 stores customer data, item data, order data, picker data, and session data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data and may use databases to organize the stored data.

Figure 3:
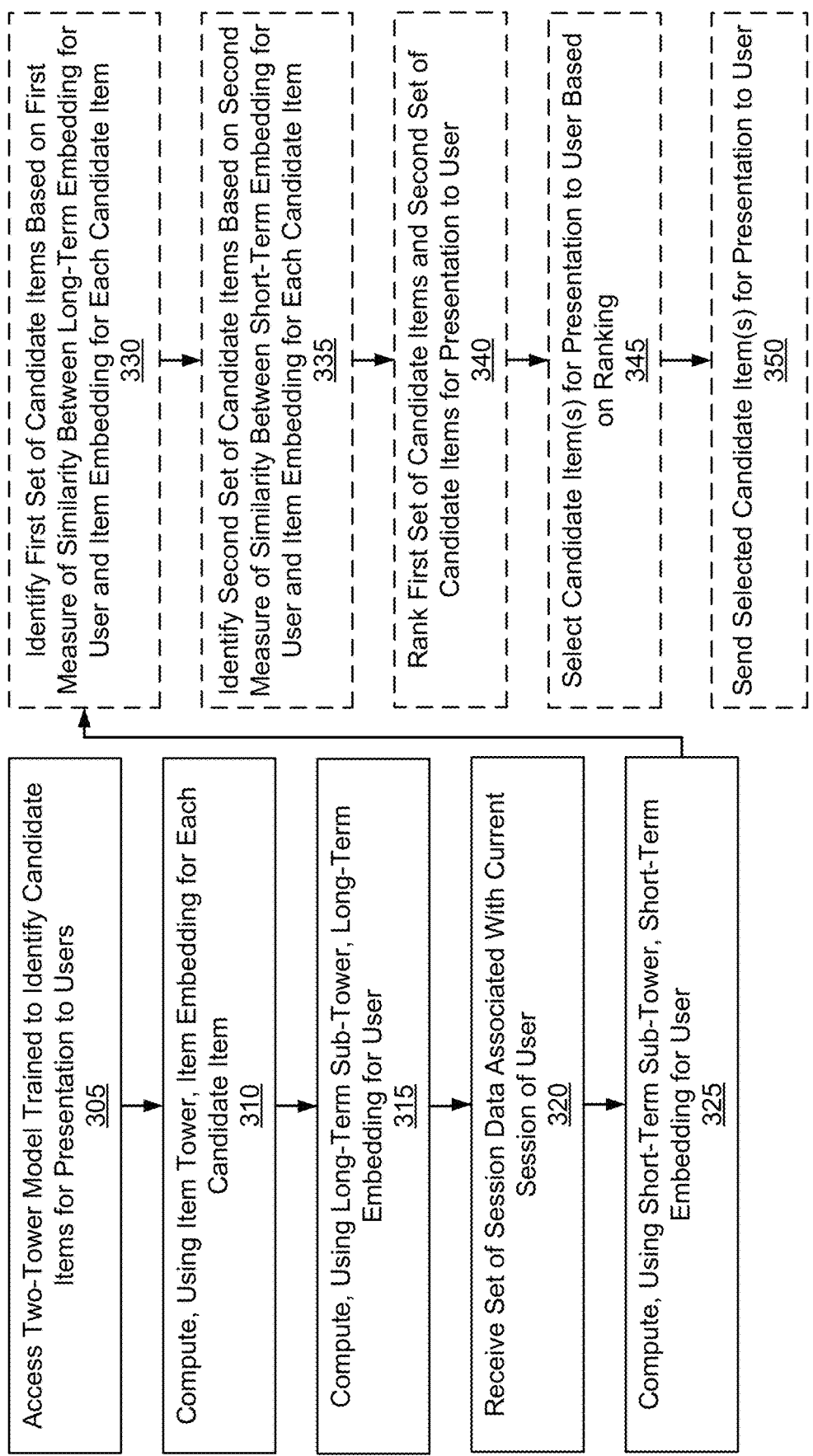
FIG. 3 is a flowchart of a method for computing long-term and short-term user embeddings using long-term and short-term user sub-towers of a two-tower model, in accordance with one or more embodiments.

Determining Long-Term and Short-Term User Embeddings Using Long-Term and Short-Term User Sub-Towers of a Two-Tower Model FIG. 3 is a flowchart of a method for computing long-term and short-term user embeddings using long-term and short-term user sub-towers of a two-tower model, in accordance with one or more embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 accesses 305 (e.g., using the candidate identification module 212) a two-tower model, which is a two-tower structured deep learning model that is trained to identify candidate items for presentation to users (e.g., customers) of the online system 140. The two-tower model may include an item tower and a user tower, in which the item tower is trained to compute item embeddings and the user tower is trained to compute user embeddings, such that each item and each user is represented as an N-dimensional embedding vector. Furthermore, the user tower may include a long-term sub-tower and a short-term sub-tower, in which the long-term sub-tower is trained to compute long-term embeddings describing long-term information associated with users and the short-term sub-tower is trained to compute short-term embeddings describing short-term information associated with users. The long-term embeddings may be computed based on user data associated with users (e.g., historical order or interaction information, user preferences, etc.) and may be pre-computed, while the short-term embeddings may be computed based on real-time session data associated with users and therefore may not be pre-computed. Although the short-term embeddings may not be pre-computed, the short-term sub-tower is lighter weight than the long-term sub-tower, allowing the short-term embeddings to be computed with low latency. In various embodiments, rather than an item tower, the two-tower model includes a tower that is trained to compute embeddings for objects other than items, such as content items (e.g., advertisements, social media posts, etc.), videos, images, games, recipes, or any other types of objects that may be recommended to users of the online system 140. In some embodiments, the two-tower model may be trained by the online system 140 (e.g., using the machine learning training module 230).

Figure 4:
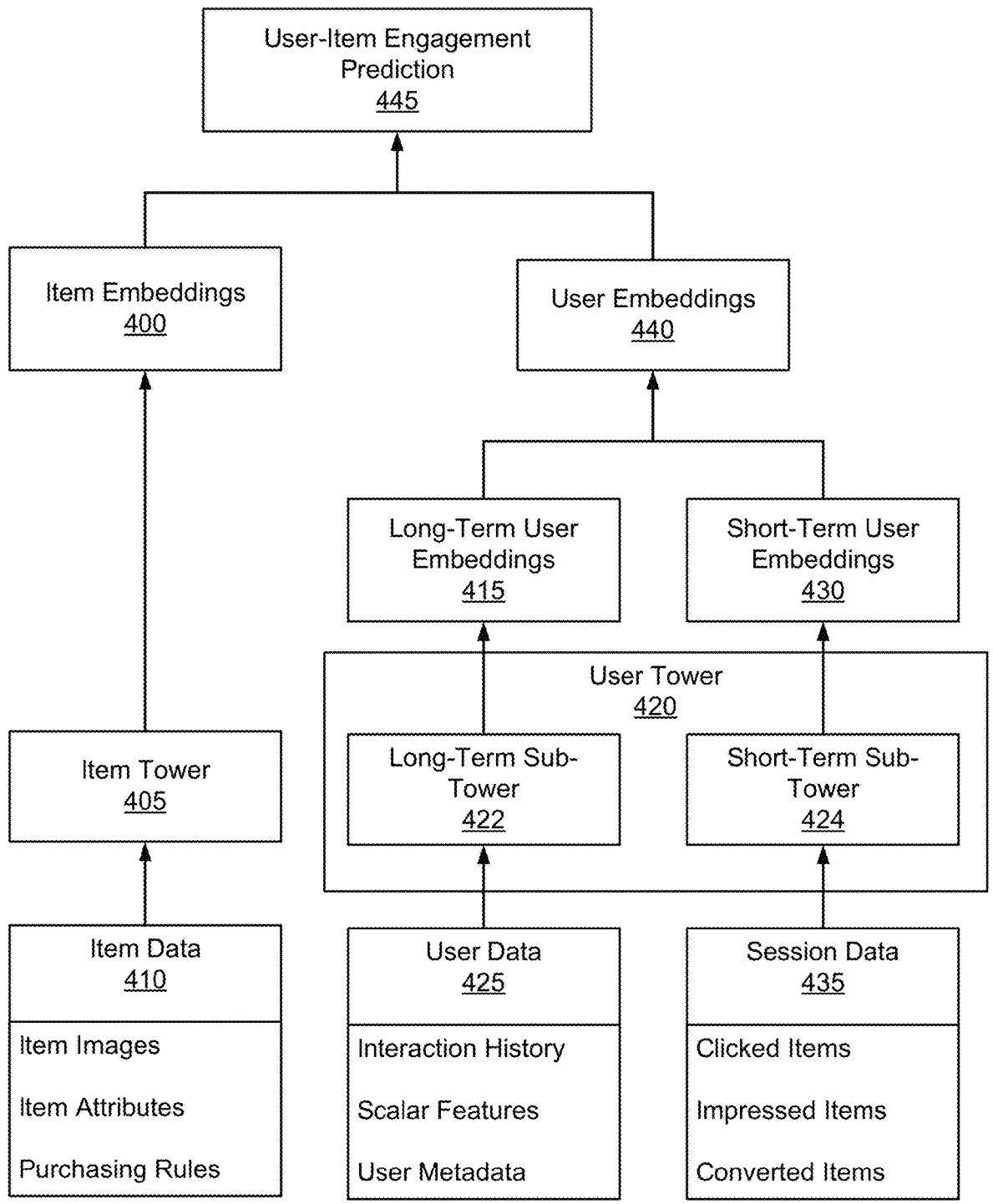
FIG. 4 illustrates an example of a two-tower model including an item tower and a user tower, in which the user tower includes a long-term sub-tower and a short-term sub-tower, in accordance with one or more embodiments.

In embodiments in which the online system 140 trains the two-tower model, the online system 140 does so based on various types of data (e.g., item data, user data, and session data) received by the online system 140 (e.g., via the data collection module 200). FIG. 4 illustrates an example of a two-tower model including an item tower 405 and a user tower 420, in which the user tower 420 includes a long-term sub-tower 422 and a short-term sub-tower 424, in accordance with one or more embodiments. The online system 140 may train the item tower 405 based on item data 410. For example, the item tower 405 may be trained based on images of items, attributes (e.g., names, item categories, etc.) of items, purchasing rules for items, etc. In embodiments in which the two-tower model includes a tower that is trained to compute embeddings for objects other than items, the online system 140 trains the tower based on data (e.g., target audiences, topics, subjects, hashtags, etc.) for the objects. The online system 140 may train the long-term sub-tower 422 of the user tower 420 based on various types of user data 425 (e.g., customer data). For example, the long-term sub-tower 422 of the user tower 420 may be trained based on order/interaction histories, scalar features (number of items included in each previous order), metadata (e.g., demographic information), etc. associated with customers. The online system 140 may train the short-term sub-tower 424 of the user tower 420 based on session data 435. For example, the short-term sub-tower 424 of the user tower 420 may be trained based on information describing items customers clicked on, items presented to customers, and conversions for items by customers.

Referring still to FIG. 4, the online system 140 may train the item tower 405 and user tower 420 together. To do so, the online system 140 may first compute a user embedding 440 by combining the long-term embedding 415 and the short-term embedding 430 for each user. For example, a user embedding 440 may be computed as a weighted sum of a long-term embedding 415 for a user and a short-term embedding 430 for the user. Then, the online system 140 may determine a measure of similarity between the user embedding 440 and an item embedding 400 (e.g., as a dot product, a cosine similarity, etc.) corresponding to a user-item engagement prediction 445. The user-item engagement prediction 445 indicates a likelihood that an event between a user and an item (e.g., a conversion event) occurred, such that the event is predicted to have occurred if the item is represented by an item embedding 400 having at least a threshold measure of similarity to the user embedding 440.

The process used by the online system 140 to train the two-tower model may be a classification task, in which a label indicates whether an event between a user and an item occurred (e.g., whether a customer purchased the item), such that a positive label indicates the event occurred and a negative label indicates the event did not occur. The negative labels may be obtained using a negative sampling strategy (e.g., uniform random sampling, popular random sampling, impressions-based sampling, etc.). For example, negative sampling strategies may obtain negative labels using a strategy that samples items uniformly, randomly, based on their popularity, based on whether they were presented to a customer, based on whether a customer ever interacted with them, etc. When training the two-tower model, the online system 140 minimizes a loss function that measures the difference between the predicted and actual events. Based on the loss function, backpropagation is used to update the parameters of the model using an optimization algorithm (e.g., stochastic gradient descent) and the process is repeated to fine-tune the parameters until an optimal set of parameters is obtained. Since the data used to train the two-tower model may be biased (e.g., if the optimal set of parameters biases the identification of candidate items in favor of a particular source), the online system 140 may counter this by adjusting a bias associated with identifying candidate items from various sources using one or more of the techniques described below.

Referring back to FIG. 3, the online system 140 then uses the item tower 405 of the two-tower model to compute 310 (e.g., using the embedding computation module 213) an item embedding 400 for each of multiple candidate items eligible for presentation to a user of the online system 140. A candidate item may be any item that is eligible for presentation to the user. For example, if the user is browsing items in a storefront for a retailer, candidate items may include all items included among an inventory of the retailer. The online system 140 may compute 310 the item embeddings 400 for the candidate items based on item data 410 associated with the candidate items. For example, the online system 140 may use the item tower 405 to compute 310 an item embedding 400 for a candidate item based on images or videos of the candidate item. In the above example, the online system 140 also or alternatively may use the item tower 405 to compute 310 the item embedding 400 based on text data associated with the candidate item (e.g., a name, a description, an item category, a brand, a manufacturer, etc. of the candidate item). In embodiments in which the two-tower model includes a tower that is trained to compute embeddings for objects other than items, the online system 140 computes (step 310) embeddings for candidate objects in an analogous manner.

The online system 140 also uses the long-term sub-tower 422 of the user tower 420 of the two-tower model to compute 315 (e.g., using the candidate identification module 212) a long-term embedding 415 for the user. As described above, a long-term embedding 415 may be computed 315 based on user data 425 (e.g., customer data) associated with the user. For example, the online system 140 may use the long-term sub-tower 422 to compute 315 a long-term embedding 415 for the user based on historical order or interaction information for the user (e.g., SKUs of each item the user ordered or with which the user interacted, a timestamp associated with each order or interaction, etc.) and a number of items included in each order placed by the user. In this example, the long-term embedding 415 for the user also may be computed 315 based on a number of items for which the user searched, demographic information associated with the user (e.g., age, gender, etc.), a set of preferences associated with the user (e.g., dietary preferences), etc. As also described above, the online system 140 may pre-compute the long-term embedding 415 for the user. For example, the online system 140 may compute 315 the long-term embedding 415 for the user before the online system 140 generates and transmits (e.g., using the interface module 211) an ordering interface for the user to order items (e.g., when the user is offline).

The online system 140 may then receive 320 (e.g., via the data collection module 200) a set of session data 435 associated with a current session of the user. The set of session data 435 may identify the session (e.g., via a session ID) and the user (e.g., via a username) and describe a client device (e.g., a mobile device or a laptop computer) or software (e.g., a browser or a client application) used to communicate with the online system 140, a location associated with the user (e.g., GPS coordinates of the client device), and a time frame associated with the session. The set of session data 435 also may describe the user's interactions with the online system 140, such as information describing items with which the user interacted, item data 410 for the items, information describing types of the interactions (e.g., browsing, selecting, or searching for items, adding items to a shopping list, etc.), times of the interactions, dwell time, etc. For example, the online system 140 may receive 320 real-time session data 435 for the user, in which the real-time session data 435 describes items presented to the user, items the user added to a shopping list, items for which the user searched, items the user browsed, items the user selected, etc.

The online system 140 then uses the short-term sub-tower 424 of the user tower 420 of the two-tower model to compute 325 (e.g., using the embedding computation module 213) a short-term embedding 430 for the user based on the set of session data 435. As described above, the short-term embedding 430 may be computed 325 based on the real-time session data 435 associated with the user and therefore may not be pre-computed. Continuing with the example above, the online system 140 may use the short-term sub-tower 424 to compute 325 the short-term embedding 430 for the user based on the real-time session data 435.

The online system 140 may then identify (e.g., using the candidate identification module 212) candidate items for presentation to the user. The online system 140 may do so based on a maximum number of candidate items that may be evaluated due to limited computational resources available to perform the evaluation (e.g., to score, rank, and select candidate items for presentation to the user). For example, out of a total of 10,000 candidate items included among an inventory of a retailer, the online system 140 may identify 200 candidate items for presentation to the user since only 200 candidate items may be evaluated without high latency. The online system 140 may identify one or more sets of candidate items from various sources. In doing so, the online system 140 may identify each set of candidate items from a source (e.g., a popularity-based source, an embedding-based source, etc.) using an algorithm. In embodiments in which the online system 140 identifies candidate items from multiple sources, one or more candidate items may be included in more than one source.

Figure 5A:
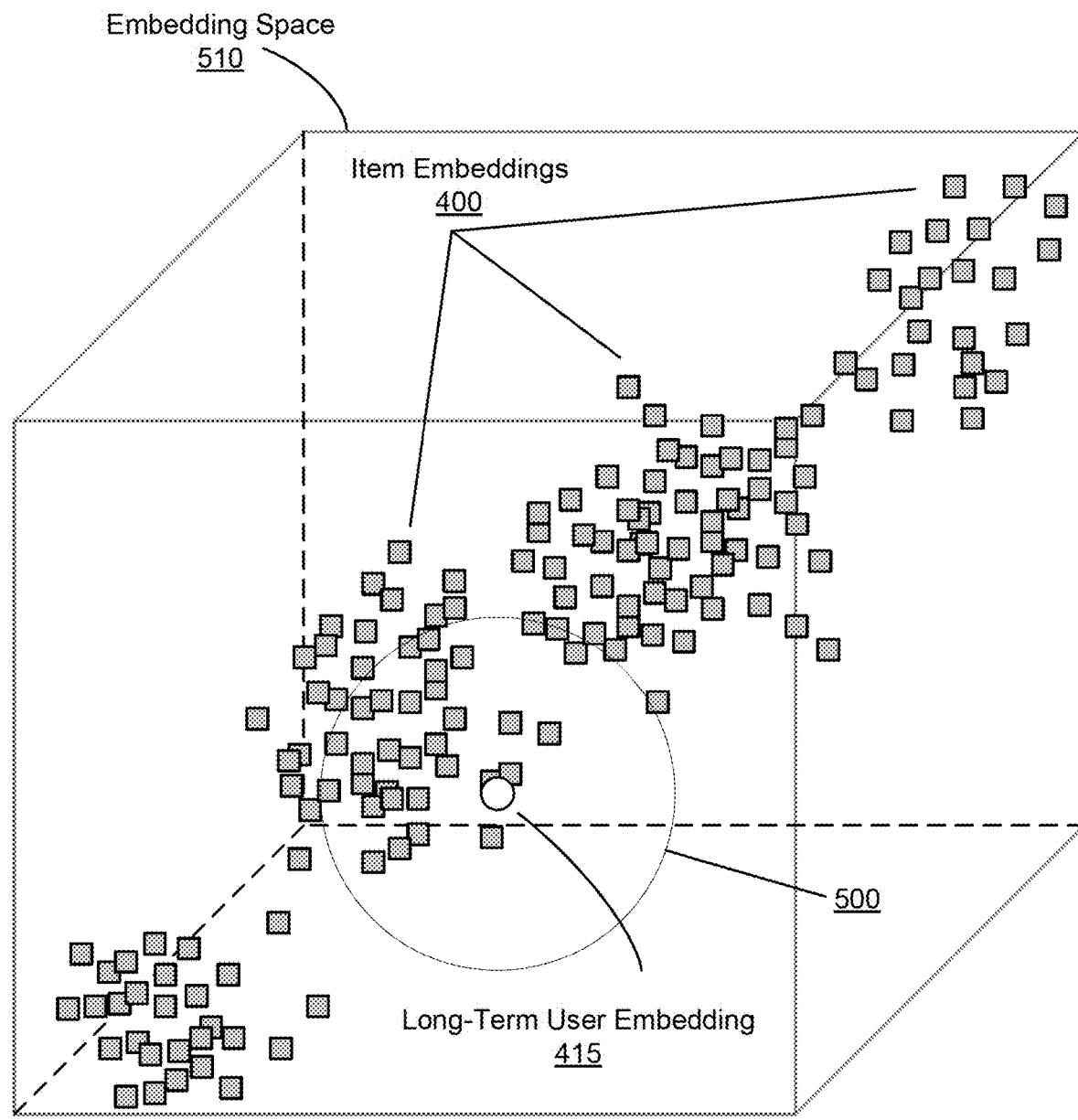
FIG. 5A illustrates an example of identifying a set of candidate items for presentation to a user based on a measure of similarity between a long-term embedding for the user and an item embedding for each candidate item, in accordance with one or more embodiments.

The online system 140 may identify 330 (e.g., using the candidate identification module 212) a first set of candidate items for presentation to the user based on a measure of similarity between the long-term embedding 415 for the user and the item embedding 400 for each candidate item. The online system 140 may determine the measure of similarity using a k-nearest neighbors (KNN) algorithm, a cosine similarity, a Euclidean similarity, a dot product, etc., such that the item embedding 400 for each identified candidate item has at least a threshold measure of similarity to the long-term embedding 415 for the user. FIG. 5A illustrates an example of identifying 330 a set of candidate items for presentation to a user based on a measure of similarity between a long-term embedding 415 for the user and an item embedding 400 for each candidate item, in accordance with one or more embodiments. As shown in this example, the first set of candidate items identified 330 by the online system 140 may have item embeddings 400 that are within a threshold distance 500 of the long-term embedding 415 for the user within an embedding space 510.

Figure 5B:
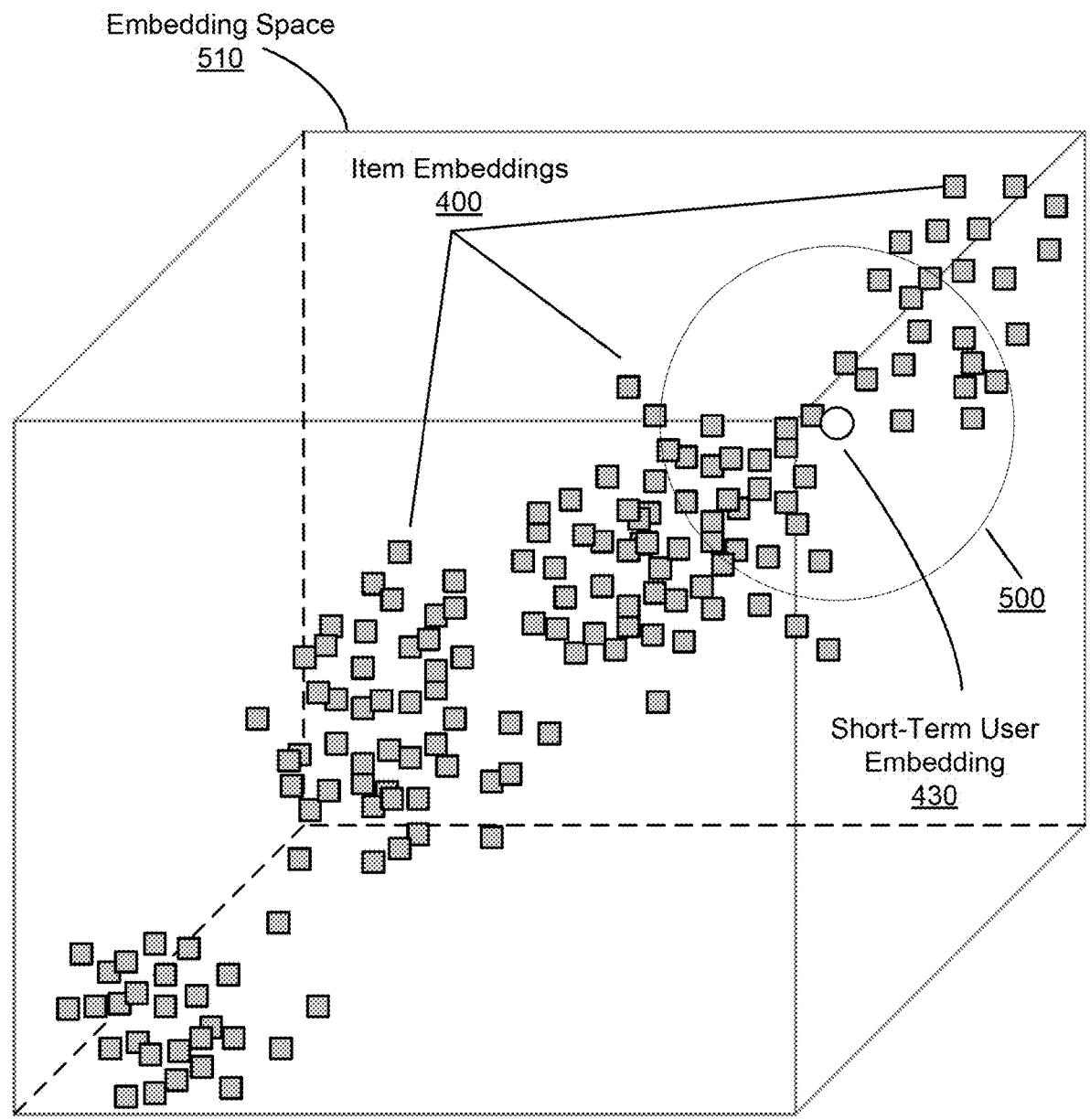
FIG. 5B illustrates an example of identifying a set of candidate items for presentation to a user based on a measure of similarity between a short-term embedding for the user and an item embedding for each candidate item, in accordance with one or more embodiments.

Referring back to FIG. 3, the online system 140 also may identify 335 (e.g., using the candidate identification module 212) a second set of candidate items for presentation to the user based on a measure of similarity between the short-term embedding 430 for the user and the item embedding 400 for each candidate item. The online system 140 may determine the measure of similarity using a k-nearest neighbors (KNN) algorithm, a cosine similarity, a Euclidean similarity, a dot product, etc., such that the item embedding 400 for each identified candidate item has at least a threshold measure of similarity to the short-term embedding 430 for the user. FIG. 5B illustrates an example of identifying 335 a set of candidate items for presentation to a user based on a measure of similarity between a short-term embedding 430 for the user and an item embedding 400 for each candidate item, in accordance with one or more embodiments. As shown in this example, the second set of candidate items identified 335 by the online system 140 may have item embeddings 400 that are within a threshold distance 500 of the short-term embedding 430 for the user within an embedding space 510. In embodiments in which the two-tower model includes a tower that is trained to compute embeddings for objects other than items, the online system 140 identifies (steps 330 and 335) candidate objects in an analogous manner.

The online system 140 may determine (e.g., using the candidate identification module 212) a number or percentage of candidate items identified (steps 330 and 335) from a particular source for presentation to the user. In some embodiments, the online system 140 makes the determination in real time based on information that is specific to the user (e.g., a set of preferences associated with the user, a set of contextual features associated with the user, etc.) using an algorithm (e.g., a contextual bandit algorithm). The algorithm solves an optimization problem for a policy that specifies the number/percentage of candidate items identified (steps 330 and 335) from different sources. For example, assuming the optimization problem is in a stochastic bandit setting, in which the reward corresponds to conversions for identified candidate items by a user, the online system 140 may solve for a policy that maximizes the long-term expected rewards based on an optimal number or percentage of candidate items identified (steps 330 and 335) from each source. In this example, the online system 140 may solve for the policy based on a total number of candidate items that may be identified (steps 330 and 335), a number of sources from which candidate items may be identified (steps 330 and 335), a set of contextual features, a set of features of each source (e.g., an algorithm associated with each source used to identify (steps 330 and 335) candidate items), or any other suitable types of information. In the above example, the set of contextual features may include metadata (e.g., demographic information) associated with the user, one or more surfaces (e.g., search results or browsing) for presenting the candidate items, a time of day, etc. In embodiments in which the online system 140 identifies (steps 330 and 335) candidate objects, the online system 140 also determines a number or a percentage of candidate objects identified (steps 330 and 335) from a particular source in an analogous manner.

Due to bias that may be introduced when training the two-tower model described above, the online system 140 may adjust (e.g., using the candidate identification module 212) a bias associated with identifying (steps 330 and 335) the candidate items for presentation to the user from various sources. When solving the optimization problem for the policy that specifies the number/percentage of candidate items identified (steps 330 and 335) from different sources described above, the online system 140 may adjust this bias by modifying the reward using a weighting function. The weighting function may be based on a number or percentage of candidate items identified (steps 330 and 335) from a particular source. For example, the weighting function for a source may be inversely proportional to the number/percentage of candidate items identified (steps 330 and 335) from the source. The online system 140 also may adjust the bias based on a set of rules describing a penalty that is applied in response to identifying (steps 330 and 335) each candidate item from a particular source. For example, if the online system 140 identifies (steps 330 and 335) a candidate item from a particular source, the online system 140 may apply a penalty to the source based on a set of rules, such that additional candidate items are less likely to be identified (steps 330 and 335) from this source. The online system 140 also may adjust the bias associated with identifying (steps 330 and 335) candidate items from various sources based on a hard limit associated with each source. For example, each source of candidate items may be associated with a hard limit corresponding to a threshold number of candidate items that may be identified (steps 330 and 335) from the source, such that once the threshold number of candidate items have been identified (steps 330 and 335) from the source, additional candidate items must be identified (steps 330 and 335) from other sources. The online system 140 also may adjust the bias associated with identifying (steps 330 and 335) candidate items from various sources using a greedy algorithm (e.g., the E-greedy algorithm) or using any other suitable technique or combination of techniques. In some embodiments, the online system 140 adjusts a bias associated with identifying candidate objects for presentation to the user in an analogous manner.

Referring once more to FIG. 3, the online system 140 may then rank 340 (e.g., using the ranking module 215) the first and second sets of candidate items identified (steps 330 and 335) by the online system 140. The online system 140 may rank 340 the sets of candidate items based on a score computed for each candidate item by the online system 140 (e.g., using the scoring module 214). For example, based on a score computed for each of multiple candidate items, the online system 140 may rank 340 the candidate items from highest to lowest based on the scores, such that a candidate item having a highest score is ranked 340 first, a candidate item having a second-highest score is ranked 340 second, etc. The online system 140 may score each candidate item based on a likelihood that the user will order it (e.g., predicted using an item selection model), based on a likelihood that it will be available (e.g., predicted using an availability model), etc. In embodiments in which the online system 140 identifies (steps 330 and 335) candidate objects, the online system 140 ranks 340 the candidate objects in a manner analogous to that described above.

The online system 140 then selects 345 (e.g., using the selection module 216) one or more candidate items and sends 350 (e.g., using the interface module 211) the candidate item(s) for presentation to the user. The online system 140 may select (step 345) the candidate item(s) based on a score or a ranking associated with each candidate item. For example, the online system 140 may select (step 345) candidate items with scores that are at least a threshold score for presentation to the user. As an additional example, the online system 140 may select (step 345) candidate items with at least a threshold ranking for presentation to the user. In the above examples, the online system 140 then sends 350 the selected candidate items to a client device associated with the user, in which the selected candidate items are included in a carousel of recommended items presented in the ordering interface. In some embodiments, the online system 140 selects 345 one or more candidate objects and sends 350 the candidate object(s) for presentation to the user in a manner analogous to that described above.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated with the machine learning model through a back-propagation process. The weights may be stored on one or more computer-readable media and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
    accessing a two-tower model that comprises an item tower trained to compute item embeddings for items and a user tower trained to compute user embeddings for users, and wherein the user tower comprises a long-term sub-tower trained to compute long-term embeddings for users and a short-term sub-tower trained to compute short-term embeddings for users;
    logging, by an online system, session data about actions of a user device during a current session between the user device and the online system;
    determining, using the short-term sub-tower, a short-term embedding for the user based on the session data;
    retrieving, using the long-term sub-tower, a long-term embedding for a user of the online system associated with the user device, wherein the long-term embedding for the user is computed before receiving the session data associated with the current session of the user of the online system;
    combining the long-term embedding and the short-term embedding to form a user embedding;
    determining, using the item tower, an item embedding for each candidate item of a plurality of candidate items;
    determining a score for each candidate item of the plurality of candidate items by comparing the item embedding of the candidate item with the user embedding;
    selecting a candidate item of the plurality of candidate items based on the scores; and
    sending, from the online system to the user device, a recommendation to interact with the selected candidate item, wherein the sending causes the user device to display the recommendation to the user.

2. The method of claim 1, further comprising:
    identifying a first set of the plurality of candidate items for presentation to the user based at least in part on a first measure of similarity between the long-term embedding for the user and the item embedding for each candidate item;
    identifying a second set of the plurality of candidate items for presentation to the user based at least in part on a second measure of similarity between the short-term embedding for the user and the item embedding for each candidate item;
    ranking the first set of candidate items and the second set of candidate items for presentation to the user;
    selecting one or more candidate items for presentation to the user based at least in part on the ranking; and
    sending the selected one or more candidate items for presentation to the user.

3. The method of claim 2, further comprising:
    determining a first number of candidate items included in the first set of the plurality of candidate items and a second number of the plurality of candidate items included in the second set of the plurality of candidate items, based at least in part on a contextual bandit algorithm and one or more of: a set of preferences associated with the user or a set of contextual features associated with the user.

4. The method of claim 3, wherein the set of contextual features includes one or more of: a surface for presenting the selected one or more candidate items to the user, a set of metadata associated with the user, or a time of day associated with the user.

5. The method of claim 2, further comprising:
    adjusting a bias associated with identifying one or more of the first set of the plurality of candidate items and the second set of the plurality of candidate items based at least in part on a set of rules, wherein the set of rules describes a penalty applied responsive to identifying each candidate item included in the one or more of the first set of the plurality of candidate items and the second set of the plurality of candidate items.

6. The method of claim 2, further comprising:
    adjusting a bias associated with identifying one or more of the first set of the plurality of candidate items and the second set of the plurality of candidate items based at least in part on a weighting function, wherein the weighting function is inversely proportional to a number of candidate items included in the one or more of the first set of the plurality of candidate items and the second set of the plurality of candidate items.

7. The method of claim 2, further comprising:
    determining the first measure of similarity and the second measure of similarity using a nearest neighbor algorithm.

8. The method of claim 1, wherein the user tower and the item tower are trained together by, for each training example of a plurality of training examples:
    determining a user embedding for a user of the training example using the user tower;
    determining an item embedding for an item of the training example using the item tower;
    determining a measure of similarity between the user embedding and the item embedding;
    determining an error term between the determined measure of similarity and an observation about an interaction between the user and the item from the training example; and
    adjusting parameters of the user tower and the item tower based on the determined error.

9. The method of claim 8, wherein computing the user embedding comprises computing user embeddings for each user of a plurality of users as a weighted sum of the long-term embedding and the short-term embedding computed for a corresponding user of the online system.

10. A computer program product comprising a non-transitory computer-readable storage medium having instructions encoded thereon that, when executed by a processor, cause the processor to perform steps comprising:
    accessing a two-tower model that comprises an item tower trained to compute item embeddings for items and a user tower trained to compute user embeddings for users, and wherein the user tower comprises a long-term sub-tower trained to compute long-term embeddings for users and a short-term sub-tower trained to compute short-term embeddings for users;
    logging, by an online system, session data about actions of a user device during a current session between the user device and the online system;
    determining, using the short-term sub-tower, a short-term embedding for the user based on the session data;
    retrieving, using the long-term sub-tower, a long-term embedding for a user of the online system associated with the user device, wherein the long-term embedding for the user is computed before receiving the session data associated with the current session of the user of the online system;
combining the long-term embedding and the short-term embedding to form a user embedding;
determining, using the item tower, an item embedding for each candidate item of a plurality of candidate items;
determining a score for each candidate item of the plurality of candidate items by comparing the item embedding of the candidate item with the user embedding;
selecting a candidate item of the plurality of candidate items based on the scores; and
sending, from the online system to the user device, a recommendation to interact with the selected candidate item, wherein the sending causes the user device to display the recommendation to the user.

11. The computer program product of claim 10, wherein the computer-readable storage medium further has instructions encoded thereon that, when executed by the processor, cause the processor to perform steps comprising:
identifying a first set of the plurality of candidate items for presentation to the user based at least in part on a first measure of similarity between the long-term embedding for the user and the item embedding for each candidate item;
identifying a second set of the plurality of candidate items for presentation to the user based at least in part on a second measure of similarity between the short-term embedding for the user and the item embedding for each candidate item;
ranking the first set of candidate items and the second set of candidate items for presentation to the user;
selecting one or more candidate items for presentation to the user based at least in part on the ranking; and
sending the selected one or more candidate items for presentation to the user.

12. The computer program product of claim 11, wherein the computer-readable storage medium further has instructions encoded thereon that, when executed by the processor, cause the processor to perform steps comprising:
determining a first number of candidate items included in the first set of the plurality of candidate items and a second number of the plurality of candidate items included in the second set of the plurality of candidate items, based at least in part on a contextual bandit algorithm and one or more of: a set of preferences associated with the user or a set of contextual features associated with the user.

13. The computer program product of claim 12, wherein the set of contextual features includes one or more of: a surface for presenting the selected one or more candidate items to the user, a set of metadata associated with the user, or a time of day associated with the user.

14. The computer program product of claim 11, wherein the computer-readable storage medium further has instructions encoded thereon that, when executed by the processor, cause the processor to perform steps comprising:
adjusting a bias associated with identifying one or more of the first set of the plurality of candidate items and the second set of the plurality of candidate items based at least in part on a set of rules, wherein the set of rules describes a penalty applied responsive to identifying each candidate item included in the one or more of the first set of the plurality of candidate items and the second set of the plurality of candidate items.

15. The computer program product of claim 11, wherein the computer-readable storage medium further has instructions encoded thereon that, when executed by the processor, cause the processor to perform steps comprising:
adjusting a bias associated with identifying one or more of the first set of the plurality of candidate items and the second set of the plurality of candidate items based at least in part on a weighting function, wherein the weighting function is inversely proportional to a number of candidate items included in the one or more of the first set of the plurality of candidate items and the second set of the plurality of candidate items.

16. The computer program product of claim 11, wherein the computer-readable storage medium further has instructions encoded thereon that, when executed by the processor, cause the processor to perform steps comprising:
determining the first measure of similarity and the second measure of similarity using a nearest neighbor algorithm.

17. The computer program product of claim 10, wherein the user tower and the item tower are trained together by, for each training example of a plurality of training examples:
determining a user embedding for a user of the training example using the user tower;
determining an item embedding for an item of the training example using the item tower;
determining a measure of similarity between the user embedding and the item embedding;
determining an error term between the determined measure of similarity and an observation about an interaction between the user and the item from the training example; and
adjusting parameters of the user tower and the item tower based on the determined error.

18. The computer program product of claim 17, wherein computing the user embedding comprises computing user embeddings for each user of a plurality of users as a weighted sum of the long-term embedding and the short-term embedding computed for a corresponding user of the online system.

19. A computer system comprising:
a processor; and
a non-transitory computer-readable storage medium storing instructions that, when executed by the processor, perform actions comprising:
accessing a two-tower model that comprises an item tower trained to compute item embeddings for items and a user tower trained to compute user embeddings for users, and wherein the user tower comprises a long-term sub-tower trained to compute long-term embeddings for users and a short-term sub-tower trained to compute short-term embeddings for users;
logging, by an online system, session data about actions of a user device during a current session between the user device and the online system;
determining, using the short-term sub-tower, a short-term embedding for the user based on the session data;
retrieving, using the long-term sub-tower, a long-term embedding for a user of the online system associated with the user device, wherein the long-term embedding for the user is computed before receiving the session data associated with the current session of the user of the online system;
combining the long-term embedding and the short-term embedding to form a user embedding;
determining, using the item tower, an item embedding for each candidate item of a plurality of candidate items;

determining a score for each candidate item of the plurality of candidate items by comparing the item embedding of the candidate item with the user embedding;

selecting a candidate item of the plurality of candidate items based on the scores; and sending, from the online system to the user device, a recommendation to interact with the selected candidate item, wherein the sending causes the user device to display the recommendation to the user.

* * * * *